US012078303B1

(12) United States Patent
Huang

(10) Patent No.: US 12,078,303 B1
(45) Date of Patent: Sep. 3, 2024

(54) LIGHT SOURCE MODULE FOR ELECTRONIC CANDLE AND ELECTRONIC CANDLE

(71) Applicant: Liwei Huang, Shenzhen (CN)

(72) Inventor: Liwei Huang, Shenzhen (CN)

( * ) Notice: Subject to any disclaimer, the term of this patent is extended or adjusted under 35 U.S.C. 154(b) by 0 days.

(21) Appl. No.: 18/525,886

(22) Filed: Dec. 1, 2023

(30) Foreign Application Priority Data

Nov. 7, 2023 (CN) ......................... 202322995773.5

(51) Int. Cl.
*F21S 10/04* (2006.01)
*F21V 23/00* (2015.01)
*F21Y 115/10* (2016.01)

(52) U.S. Cl.
CPC ........... *F21S 10/046* (2013.01); *F21S 10/043* (2013.01); *F21V 23/003* (2013.01); *F21Y 2115/10* (2016.08)

(58) Field of Classification Search
CPC ........ F21S 10/046; F21S 10/043; F21S 10/04; F21S 10/00; F21V 23/003; F21V 23/00; F21V 23/004; F21Y 2115/10; F21W 2121/00
See application file for complete search history.

(56) References Cited

U.S. PATENT DOCUMENTS 5,924,784 A * 7/1999 Chliwnyj .................. F21V 3/04 307/64
10,100,990 B1 10/2018 Huang
2007/0223216 A1 9/2007 Jensen et al.
2015/0369432 A1* 12/2015 Li ......................... F21V 23/003 362/249.02
2018/0163937 A1* 6/2018 Lee ...................... G09G 3/2085
2020/0217469 A1* 7/2020 Fan ....................... F21S 10/046
2023/0044410 A1* 2/2023 Zhang ..................... F21V 23/06

* cited by examiner

*Primary Examiner* — Bao Q Truong
(74) *Attorney, Agent, or Firm* — Zhigang Ma

(57) ABSTRACT

A light source module includes a circuit board, a plurality of point light sources fixed on both sides or one side of the circuit board, and a control circuit module configured for controlling ignition and extinction of the plurality of point light sources. The point light sources on each side of the circuit board are arranged in N parallel branches arranged from top to bottom. The point light sources on each parallel branch are arranged in an inverted V-shape, where N is a natural number less than or equal to 10. In the present disclosure, several parallel branches are configured to simulate different levels of a candle flame, and despite of a small number of point light sources required, a simple control circuit and a low cost, rich levels and changes in the flame are presented, and good simulation effect is achieved.

19 Claims, 4 Drawing Sheets

LIGHT SOURCE MODULE FOR ELECTRONIC CANDLE AND ELECTRONIC CANDLE

CROSS-REFERENCE TO RELATED APPLICATIONS

The present application claims priority of China Patent Application No. 202322995773.5, filed on Nov. 7, 2023, the contents of which are incorporated herein by reference

BACKGROUND OF THE INVENTION

Electronic candles are very popular with people due to their environmental friendliness and energy conservation. An electronic candle generally includes a cylindrical body configured to simulate the body of a real candle, and a flame front configured to simulate a burning flame. When a real candle burns, its flame will oscillate and fluctuate in size and height due to disturbance in a surrounding space, thus looking very flexible. An existing difficulty in design of an electronic candle lies in how to effectively simulate the burning of its flame. In the prior art, a flame front of an electronic candle is generally oscillated mechanically to change the degree of illumination of the flame front so as to achieve the simulated effect. However, a complex structure and mechanical and inflexible oscillation of the flame front result in that the simulated effect is not desired. At present, a LED array on a circuit board may also be used as a display to display the flame, but a control circuit structure is complex and costly.

SUMMARY OF THE INVENTION

An objective of the present disclosure is to provide a light source module with a simple control circuit and good flame simulation effect and an electronic candle.

A light source module for electronic candle includes a circuit board, a plurality of point light sources fixed on both sides or one side of the circuit board, and a control circuit module configured for controlling ignition and extinction of the point light sources. The point light sources on each side of the circuit board are arranged in N parallel branches arranged from top to bottom, and the point light sources on each parallel branch are arranged in an inverted V-shape, where N is a natural number less than or equal to 10.

In the present disclosure, a plurality of parallel branches are configured to simulate different levels of a flame in a candle burning process, a small number of point light sources are required, with a simple control circuit and a low cost. A plurality of parallel branches in the inverted V shape are used to simulate different levels of the flame, so that rich levels and changes in the flame can be presented. For example, a lowest power supply voltage is provided for a parallel branch at the very bottom to make an inner layer of the simulated flame have the minimum but most stable brightness; a widest range of voltages are provided for the parallel branches in the middle, and are gradually increased and decreased to make a middle layer of the simulated flame have the maximum but unstable brightness; and an irregular pulse voltage is provided for two or more parallel branches at the uppermost layer to simulate fluctuation of the flame top (an upper layer) in brightness and size such as flickering, with good simulation effect.

As an implementation, the plurality of parallel branches from bottom to top include a first parallel branch, a second parallel branch . . . , and a Nth parallel branch, where the first parallel branch is configured to simulate the inner layer of the flame, and a maximum width of the first parallel branch is at least smaller than the maximum width of the second parallel branch or the third parallel branch; at least the second parallel branch and the third parallel branch are configured to simulate a middle layer of the flame; and at least the N−1th parallel branch and the Nth parallel branch are configured to simulate an outer layer of the flame, and the maximum width of the Nth parallel branch is smaller than the maximum width of the N−1th parallel branch. In this way, vivid simulation effect can be achieved by use of minimal point light sources.

As an implementation, a distance from a vertex of the Nth parallel branch to the vertex of the N−1th parallel branch is greater than the distance from the vertex of the N−1th parallel branch to the vertex of the N−2th parallel branch, and the distance from the vertex of the N−1th parallel branch to the vertex of the N−2th parallel branch is greater than the distance from the vertex of the second parallel branch to the vertex of the first parallel branch. In this way, the leaping state of the flame top is more vivid.

As an implementation, the number of point light sources on the Nth parallel branch is greater than the number of point light sources on the other parallel branches. In this way, leaping and fluctuating (in size) states of the flame top can be simulated.

As an implementation, a lowest end of a parallel branch located at an upper layer is higher than the lowest end of a parallel branch located at a lower layer. In this way, less point light sources are required.

As an implementation, the control circuit module is fixed at the lower end of one side of the circuit board, and has a power interface, a grounding interface and N input/output interfaces, where the power interface and the grounding interface are connected to a power module, one end of each of the N parallel branches is connected to the power interface, and the other end thereof is connected to a corresponding input/output interface. The control circuit module with simple functions is easy to implement at a low cost.

As an implementation, an upper surface of the circuit board is encapsulated by yellow colloid used as an optical processing unit, to wrap the point light sources. In this way, light emitted by the light source module can be made softer, the inner layer and the middle layer of the simulated flame can be more uniform, and light beads at the outer layer of the flame can also present overall brightness, rather than the brightness of single point light sources.

As an implementation, an encapsulated part of the circuit board is bulging in the middle and thin at edges. In this way, a shape of the flame can be better simulated.

As an implementation, the point light sources are COB (chip-on-board)-LED light sources, which have the advantages of high luminous efficiency, high integration density and more uniform overall luminescence.

An electronic candle includes a housing configured for simulating a candle body, a power module that is accommodated in the housing or engaged with the bottom of the housing, and a light source module for electronic candle as described above. At least an upper part of the light source module extends from an upper end surface of the housing, and a lower part thereof is electrically connected to the power module. This light source module has all the advantages of the above light source module.

As an implementation, the light source module is rotatably connected to the housing; a magnetic element is fixed at the lower end of the circuit board; and the power module includes a coil, and the coil is opposite to the magnetic element at the lower end of the circuit board of the light source module. By powering on the coil, the magnetic element can be pushed to drive the light source module to oscillate relative to the housing, so that better simulation effect is achieved.

In the present disclosure, a plurality of parallel branches arranged on the circuit board are configured to simulate different levels of a flame in a candle burning process, a small number of point light sources are required, and only parallel branches are adopted, so that the control circuit is simple and the cost is low. These parallel branches are in the inverted V shape, and are used to simulate different levels of the flame, so that rich levels and changes in the flame can be presented. For example, leaping and fluctuating (in size) states of the flame top can be simulated, with good simulation effect.

BRIEF DESCRIPTION OF DRAWINGS

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

The invention will now be described in detail through several embodiments with reference to the accompanying drawings.

First Embodiment

Figure 1:
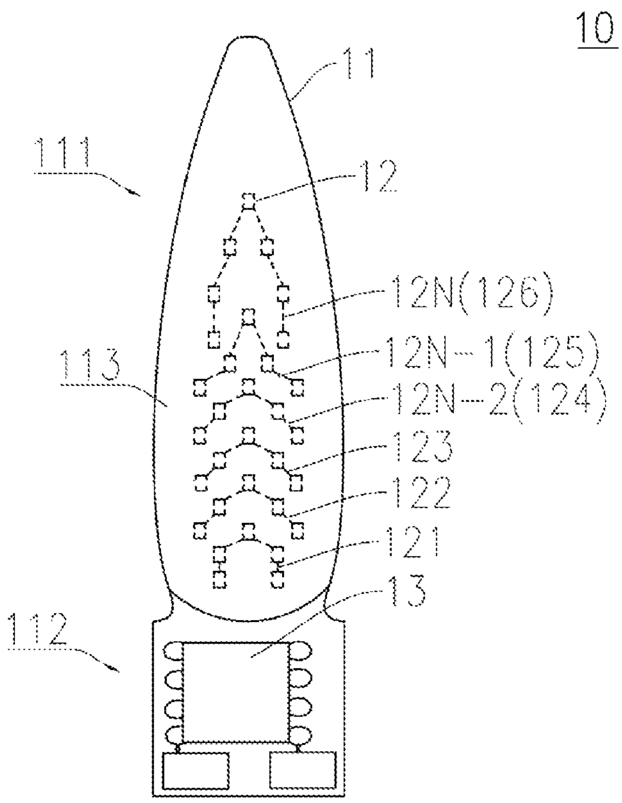
FIG. 1 is a schematic view of a light source module of an electronic candle in a first embodiment.
Figure 2:
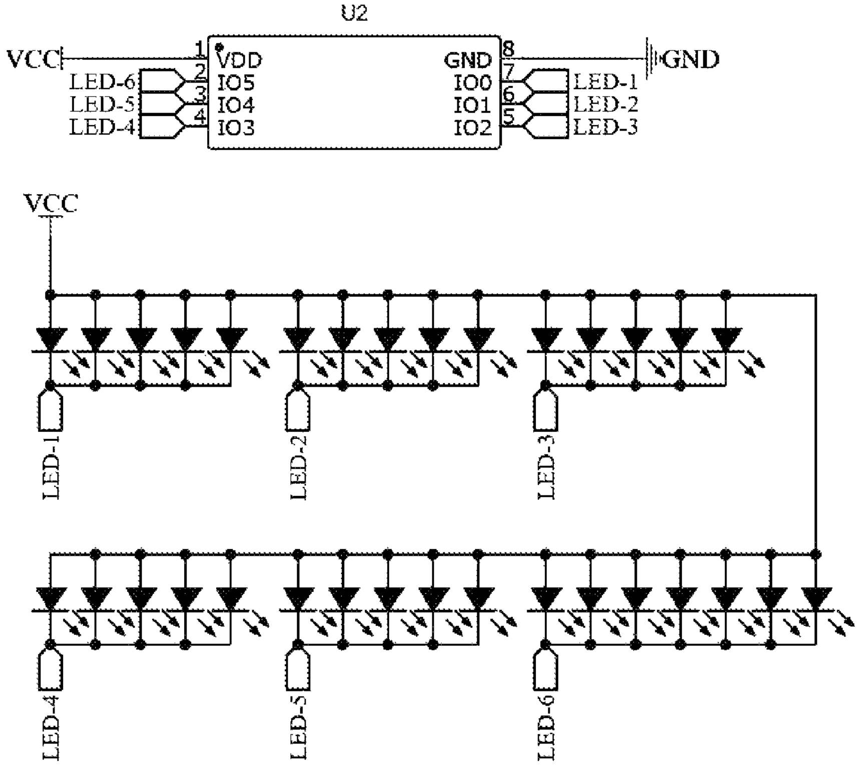
FIG. 2 is a schematic circuit diagram of the light source module in the first embodiment.

FIGS. 1 and 2 are schematic diagrams in which a structure and a circuit structure of a light source module 10 for electronic candle in a first embodiment are shown respectively. The light source module 10 mainly includes a circuit board 11, a plurality of point light sources 12 fixed on both sides of the circuit board 11, and two control circuit modules 13 fixed on the circuit board 11. The circuit board 11 may be considered to have two parts, that is, an upper part 111 and a lower part 112. The upper part 111 is configured to fix the point light sources 12 and generally is shaped like a candle flame scaled up from top to bottom, and the lower part 112 is configured to fix the control circuit module 13 and can be of any shape such as square.

In this embodiment, both sides of the upper part 111 of the circuit board 11 are encapsulated by yellow colloid 113 used as an optical processing unit to wrap the point light sources 12, and an encapsulated part of the circuit board 11 is bulging in the middle and thin at edges, so that light emitted by a plurality of point light sources 12 is softer and more uniform, and an overall shape is closer to the shape of the candle flame. Preferably, the colloid is yellow silica gel. The circuit board 11 is preferably a rigid circuit board, which can of course be a flexible circuit board, and its overall shape can be fixed by installing hard materials such as a hard plastic frame.

The point light sources 12 on both sides of the circuit board 11 are arranged in a same manner, all of which are electrically connected by electrically conductive paths inside the circuit board 11 to form N parallel branches arranged from top to bottom, where N is a natural number greater than or equal to 5 but less than or equal to 10. The point light sources 12 on each parallel branch are arranged in an inverted V shape. Due to coverage of the point light sources 12 by the colloid 113, the point light sources 12 in FIG. 1 are represented by a dashed box, and all point light sources 12 in each parallel branch are connected by dotted lines, indicating that they belong to the same parallel branch. Each point light sources 12 is essentially welded on the circuit board 11 and electrically connected to the electrically conductive paths inside the circuit board 11, thus achieving series connection of the point light sources 12 on each parallel branch, and parallel connection between N parallel branches. Two ends of each parallel branch are electrically connected to the control circuit module 13. Furthermore, only 6 parallel branches are shown in FIG. 1. It can be understood that the distance between existing parallel branches can be increased as needed to further increase the number of parallel branches to a maximum of 10, or it is even more necessary to omit the 4th parallel branch from bottom to top.

For the convenience of description, the plurality of parallel branches from bottom to top include a first parallel branch 121, a second parallel branch 122, a third parallel branch 123 . . . , and a Nth parallel branch 12N, where the first parallel branch 121 is configured to simulate an inner layer of the flame, at least the second parallel branch 122 and the third parallel branch 123 are configured to simulate a middle layer of the flame, and at least the N−1th parallel branch and the Nth parallel branch are configured to simulate an outer layer of the flame. The parallel branches with the number greater than or equal to 4 but less than or equal to N−1 can be configured to simulate the middle layer or the outer layer of the flame, so as to achieve simulation of the flame of different sizes and also better leaping effect.

A maximum width of the first parallel branch 121 (usually referring to the distance between two point light sources at a lowest end of each parallel branch) is smaller than the maximum width of the second parallel branch 122 or the third parallel branch 123. The maximum width of the Nth parallel branch 12N is smaller than the maximum width of the N−1th parallel branch. The distance from a vertex (a point light source at the top of each parallel branch) of the Nth parallel branch 12N to the vertex of the N−1th parallel branch is greater than the distance from the vertex of the N−1th parallel branch to the vertex of the N−2th parallel branch, and the distance from the vertex of the N−1th parallel branch to the vertex of the N−2th parallel branch is greater than the distance from the vertex of the second parallel branch 122 to the vertex of the first parallel branch 121. Each parallel branch is provided with 3-9 LED beads connected in parallel, the formed inverted V shape can be completely symmetrical or asymmetrical. Furthermore, the number of point light sources 12 in the Nth parallel branch 12N is greater than the number of point light sources 12 in the other parallel branches. A lowest end of a parallel branch (namely a position of the lowest point light source) located at an upper layer is higher than the lowest end of a parallel branch located at a lower layer.

The control circuit module 13 is provided with a power interface VCC, a grounding interface GND, and N input/output interfaces (10 ports, marked as LED-1 to LED-N, and specifically LED-1 to LED-6 in this embodiment). The power interface VCC and the grounding interface GND are connected to a power module (a power supply circuit), one end (usually positive) of each of the N parallel branches is connected to the power interface VCC, and the other end thereof (usually negative) is connected to a corresponding input/output interface. During operation, a low voltage, including but not limited to a voltage of 2.2-4.5 V, is outputted by means of a corresponding input/output interface, to achieve ignition and extinction of the point light sources 12 on a corresponding parallel branch. By adjusting the magnitude of this low voltage, luminous intensity of each of the point light sources 12 can be controlled to create different levels of luminous effects and simulate the effect of a real candle flame with different brightness from inside to outside. By outputting an irregular impulse voltage to the parallel branches configured for simulating the outer layer of the flame, the effect of irregular leaping and oscillation of the flame top can be created, so that the simulated flame is more vivid, with a higher level of simulation.

The point light sources 12 are preferably COB (Chip-on-Board) LED light sources. A LED chip is directly fixed on a base plate, resulting in higher integration, better color consistency, and more consistency in color temperature and color.

In this embodiment, a total of 6 parallel branches are arranged, the corresponding control circuit module 13 can be a SOP-8 chip, and each side of the circuit board is provided with a SOP-8 chip to control the point light sources on this side. The first parallel branch 121 located at the bottom layer is configured to simulate an inner layer of the flame, the second parallel branch 122 and the third parallel branch 123 are configured to simulate a middle layer of the flame, and a fourth parallel branch (marked as 12N-2 (i.e. 124) in FIG. 1), a fifth parallel branch (marked as 12N-1 (i.e. 125) in FIG. 1) and a sixth parallel branch (marked as 12N (i.e. 126) in FIG. 1) are configured to simulate an outer layer of the flame. A maximum width of the first parallel branch 121 is smaller than the maximum width of the second parallel branch 122 or the third parallel branch 123. The maximum width of the sixth parallel branch 126 is smaller than the maximum width of the fifth parallel branch 125 or the fourth parallel branch 124. The distance from the vertex of the sixth parallel branch 126 to the vertex of the fifth parallel branch 125 is greater than the distance from the vertex of the fifth parallel branch 125 to the vertex of the fourth parallel branch 124, and the distance from the vertex of the fifth parallel branch 125 to the vertex of the fourth parallel branch 124 is greater than the distance from the vertex of the second parallel branch 122 to the vertex of the first parallel branch 121, and also the distance from the vertex of the third parallel branch 123 to the vertex of the second parallel branch 122. 5 LED beads connected in parallel are arranged respectively from the first parallel branch 121 to the fifth parallel branch 125, while the sixth parallel branch 126 is provided with 7 LED beads connected in parallel. During operation, the first parallel branch 121 has the minimum brightness and is configured to simulate the inner layer of the flame, while the second parallel branch 122 and the third parallel branch 123 have the maximum brightness and are configured to simulate the middle layer of the flame. The parallel branches from the fourth parallel branch 124 to the sixth parallel branch 126 gradually decrease in brightness from bottom to top and show an irregular lighting state, which are configured to simulate an upper part of the middle layer of the flame, with good simulation effect.

Second Embodiment

Figure 3:
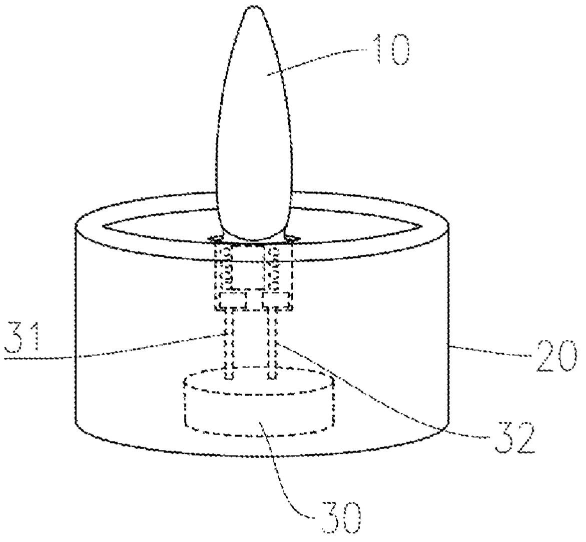
FIG. 3 is a schematic diagram of a structure of the electronic candle in a second embodiment.

FIG. 3 is a schematic diagram of a structure of an electronic candle in this embodiment. This electronic candle mainly includes a housing configured for simulating a candle body, a power module 30 that is accommodated in the housing 20 or engaged with the bottom of the housing 20, and a light source module 10 for electronic candle. This light source module 10 is the same as the light source module 10 in the first embodiment in terms of shape, structure and function.

The housing 20 is overall cylindrical in shape and may be is composed of a base and an upper cover that can be detachably engaged with the base, where the upper cover is configured to simulate a candle body, and can be made of paraffin wax to improve the simulation effect, while the base can be made of electrically insulating materials, such as plastic. An opening is formed in the middle of an upper end surface of the upper cover, where an upper part 111 of a circuit board 11 of the light source module 10 can protrude.

The power module 30 can be fixed on the base of the housing 20 and may include a battery holder and a voltage conversion circuit electrically connected to the battery holder, where the battery holder is configured to fix rechargeable or non-rechargeable batteries, and the voltage conversion circuit is configured to convert an output voltage of the battery to the output voltage VCC at which point light sources 12 on the circuit board 11 and a control circuit module 13 can be driven. A conductive wire 31 and a conductive wire 32 are led out from the power module 30 towards the inside of the housing 20, and ends of the conductive wire 31 and the conductive wire 32 are electrically connected to the circuit board 11. The upper part 111 of the light source module 10 (specifically a part where the point light sources 12 are encapsulated) extends from an upper end surface of the housing, while a lower part 112 where the control circuit module 13 is fixed is hidden inside the housing.

In order to facilitate assembly and disassembly of the light source module 10, a fixed block can be sleeved on the light source module 10, and the fixed block can be detachably clamped at the opening of the upper end surface of the upper cover.

Third Embodiment

Figure 4:
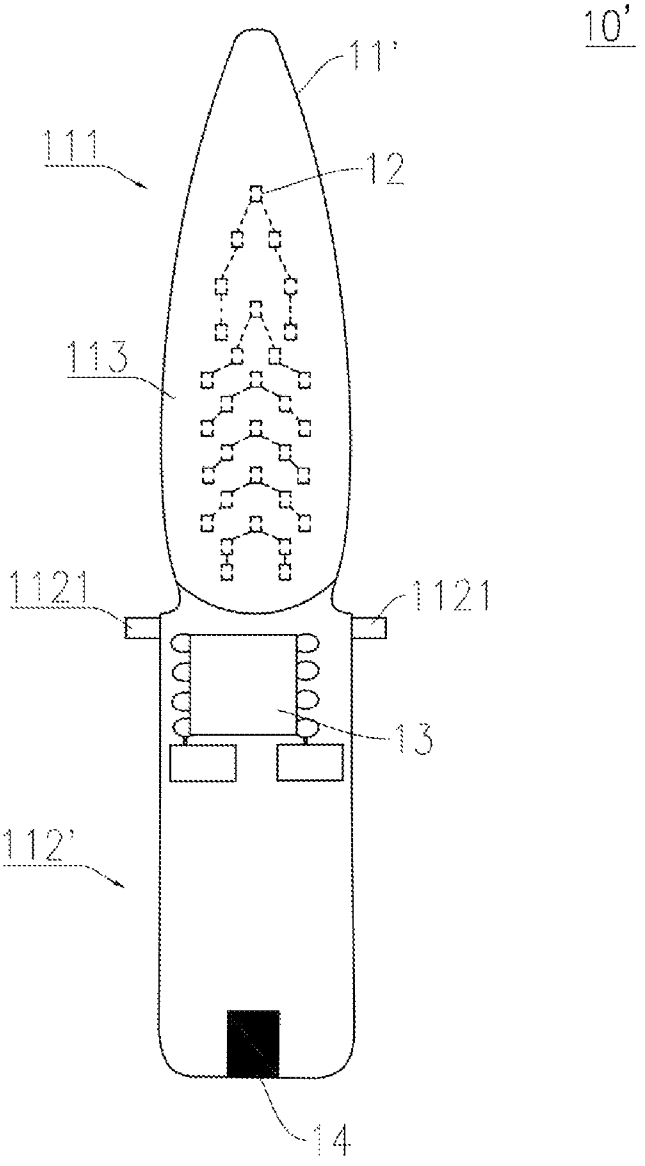
FIG. 4 is a schematic diagram of a structure of a light source module of an electronic candle in a third embodiment.

FIG. 4 is a schematic diagram in which a structure and a circuit structure of a light source module 10' for electronic candle in a third embodiment are shown respectively. The light source module 10' is similar to the light source module 10 in the first embodiment in terms of the structure, so their components with the same shapes, structures and functions are labeled in the same manner.

The light source module 10' mainly includes a circuit board 11', point light sources 12 fixed on both sides of the circuit board 11', a control circuit module 13, and a magnetic element 14 fixed at a lower end of the circuit board 11'. The circuit board 11' may be divided into two parts, and an upper part 111 thereof can be the same as the circuit board 11 in the first embodiment in terms of the shape and structure, so details are not described herein again. A lower part 112' of the circuit board 11' is longer than the lower part 112 of the circuit board 11 in the first embodiment. In addition to the fixed control circuit module 13, the magnetic element 14 is fixed in the middle of a tail end. Furthermore, shafts 1121 protruding outward are arranged at an upper end of the lower part 112' near the upper part 111 thereof. The shafts 1121 can protrude outward from two side edges of the circuit board, or from two surfaces of the circuit board. In this embodiment, the manner of protruding outward from two side edges of the circuit board is adopted. Overall, the shafts 1121 protrude outward from a middle part of the circuit board or a position near the middle part thereof. The sizes of the upper part 111 and lower part 112' of the circuit board 11' can be approximate.

The magnetic element 14 can be an electromagnet or a permanent magnet.

Fourth Embodiment

Figure 5:
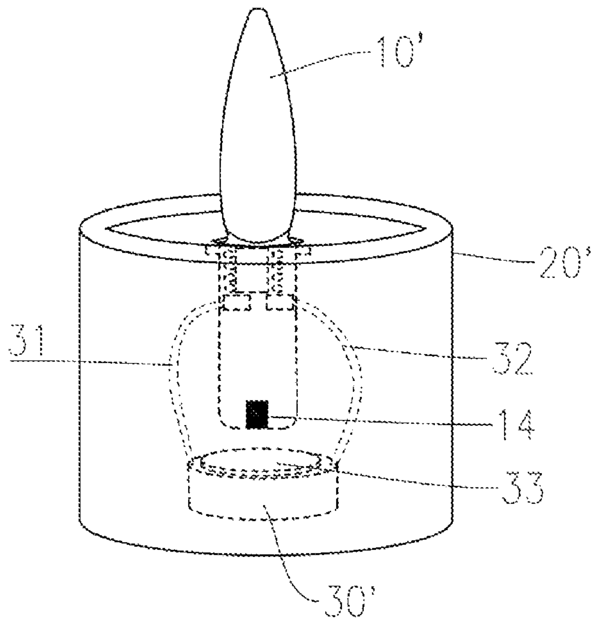
FIG. 5 is a schematic diagram of a structure of the electronic candle in a fourth embodiment.

FIG. 5 is a schematic diagram of a structure of an electronic candle in this embodiment. This electronic candle mainly includes a housing 20' configured for simulating a candle body, a power module 30' that is accommodated in the housing 20' or engaged with the bottom of the housing 20', and a light source module 10' for electronic candle. This light source module 10' is the same as the light source module 10' in the third embodiment in terms of shape, structure and function.

The housing 20' is overall cylindrical in shape and may be is composed of a base and an upper cover that can be detachably engaged with the base, where the upper cover is configured to simulate a candle body, and can be made of paraffin wax to improve the simulation effect, while the base can be made of electrically insulating materials, such as plastic. An opening is formed in the middle of an upper end surface of the upper cover, where an upper part 111 of a circuit board 11' of the light source module 10' can protrude. Two opposite fixed blocks are arranged at a lower end of the opening, and a slot is formed on either of the fixed blocks for insertion of a shaft 1121, so that the light source module 10' can be rotatably connected to the housing 20', a flame-like upper part of the light source module 10' can pendularly protrude above the housing 20', and a lower part 112' where a control circuit module 13 and a magnetic element 14 are fixed is hidden inside the housing.

The power module 30' can be fixed on the base of the housing 20' and may include a battery holder, a voltage conversion circuit electrically connected to the battery holder, a control circuit and a coil 33, where the battery holder is configured to fix rechargeable or non-rechargeable batteries, and the voltage conversion circuit is configured to convert an output voltage of the battery to the output voltage VCC at which point light sources 12 on the circuit board 11' and a control circuit module 13 can be driven. The control circuit controls the voltage conversion circuit and the coil 33. A conductive wire 31 and a conductive wire 32 are led out from the power module 30' towards the inside of the housing 20', and ends of the conductive wire 31 and the conductive wire 32 are electrically connected to the circuit board 11. The coil 33 can be arranged at the top of the battery holder but opposite to the magnetic element 14 on the light source module 10'.

During operation, the current flowing to the coil 33 is controlled to generate a preset magnetic field of the coil 33 and drive the magnetic element 14 to move, so as to drive the light source module 10' to oscillate in a preset manner, for example, to oscillate regularly or irregularly around the shaft 1121 as a rotating shaft, thus achieving better simulation effect.

In the above embodiment, the point light sources 12 are arranged on both sides of the circuit boards 11 and 11' of the light source modules 10 and 10'. It can be understood that in other embodiments, the point light sources can be arranged on only one side of the circuit board, in this case, a transparent circuit board can be adopted, and in actual use, one side of the circuit board with the point light sources should be arranged to face the user for better effect.

In the above embodiment, the point light sources are arranged on both sides of the circuit board, and a control circuit module 13 is arranged on either side of the circuit board to control all point light sources 12 on this side. It can be understood that in other embodiments, a control circuit module can be configured to control the point light sources on both sides of the circuit board.

In the above embodiment, only one circuit board is arranged. It can be understood that in other embodiments, two or more circuit boards can be spliced together to form a three-dimensional flame shape. For example, two flexible circuit boards with edges connected to each other and filled with objects in the middle for isolation can be used to form a three-dimensional flame shape that is thin at edges and bulging in the middle. For another example, three circuit boards can be spliced together to form a three-dimensional flame of shapes such as pyramid. In this case, point light sources are arranged on only one side of each circuit board.

In Embodiments 3 and 4, shafts 1121 are formed on the circuit board 11'. It can be understood that in a variant of an embodiment, a slot can be used to replace a shaft, and correspondingly, a shaft in fit with the slot should be arranged on a housing, so that a light source module can be rotatably connected to the housing.

In the description of the present disclosure, it is to be understood that the terms “upper”, “lower”, “inner”, “outer”, etc. indicate azimuthal or positional relations based on those shown in the drawings only for ease of description of the present disclosure and for simplicity of description, and are not intended to indicate or imply that the referenced device or element must have a particular orientation and be constructed and operative in a particular orientation, and thus may not be construed as a limitation on the present disclosure.

Furthermore, the terms “first” and “second” are merely for the purpose of description, and cannot be construed as indicating or implying relative importance or implicitly specifying the number of technical features indicated. Thus, a feature defined with “first” and “second” may explicitly or implicitly include one or more of the features. In the description of the present disclosure, “a plurality of” means two or more, unless expressly specified otherwise.

In the present disclosure, unless otherwise explicitly specified and defined, the terms “mounting”, “connecting”, “connection”, “fixing”, etc. should be understood in a broad sense, for example, they may be a fixed connection, a detachable connection, or an integrated connection; may be a mechanical connection, or an electrical connection; may be a direct connection, or an indirect connection via an intermediate medium; and may be communication inside two elements, or an interactive relation between two elements. For those of ordinary skill in the art, the specific meanings of the terms described above in the present disclosure may be interpreted according to specific circumstances.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A light source module for electronic candle, comprising:
a circuit board;
a plurality of point light sources fixed on both sides or one side of the circuit board; and
a control circuit module configured for controlling ignition and extinction of the plurality of point light sources;
wherein the point light sources on each side of the circuit board are configured in N parallel branches arranged from top to bottom, and the point light sources on each parallel branch are arranged in an inverted V-shape, wherein N is a natural number less than or equal to 10.

2. The light source module according to claim 1, wherein the plurality of parallel branches from bottom to top comprise a first parallel branch, a second parallel branch . . . , and a Nth parallel branch; wherein the first parallel branch is configured to simulate an inner layer of a candle flame, and a maximum width of the first parallel branch is at least smaller than a maximum width of the second parallel branch or the third parallel branch; at least the second parallel branch and the third parallel branch are configured to simulate a middle layer of the candle flame; and at least the N−1th parallel branch and the Nth parallel branch are configured to simulate an outer layer of the flame, and a maximum width of the Nth parallel branch is smaller than a maximum width of the N−1th parallel branch.

3. The light source module according to claim 2, wherein a distance from a vertex of the Nth parallel branch to a vertex of the N−1th parallel branch is greater than a distance from the vertex of the N−1th parallel branch to a vertex of the N−2th parallel branch, and the distance from the vertex of the N−1th parallel branch to a vertex of the N−2th parallel branch is greater than a distance from a vertex of the second parallel branch to a vertex of the first parallel branch.

4. The light source module according to claim 2, wherein a number of the point light sources on the Nth parallel branch is greater than a number of the point light sources on the other parallel branches.

5. The light source module according to claim 1, wherein a lowest end of a parallel branch located at an upper layer is higher than a lowest end of a parallel branch located at a lower layer.

6. The light source module according to claim 1, wherein the control circuit module is fixed at a lower end of one side of the circuit board, and has a power interface, a grounding interface and N input/output interfaces; wherein the power interface and the grounding interface are connected to a power module, one end of each of the N parallel branches is connected to the power interface, and the other end thereof is connected to a corresponding input/output interface.

7. The light source module according to claim 1, wherein an upper surface of the circuit board is encapsulated by yellow colloid used as an optical processing unit, to wrap the point light sources.

8. The light source module according to claim 7, wherein the encapsulated part of the circuit board by the yellow colloid is bulging in the middle and thin at edges.

9. The light source module according to claim 7, wherein the point light sources are COB (chip-on-board)-LED light sources.

10. A electronic candle, comprising:
a housing configured for simulating a candle body;
a power module accommodated in the housing or engaged with a bottom of the housing; and
a light source module connected with the housing;
wherein at least an upper part of the light source module extends out from an upper end of the housing, and a lower part thereof is electrically connected to the power module;
wherein the light source module comprises:
a circuit board;
a plurality of point light sources fixed on both sides or one side of the circuit board; and
a control circuit module configured for controlling ignition and extinction of the plurality of point light sources;
wherein the point light sources on each side of the circuit board are configured in N parallel branches arranged from top to bottom, and the point light sources on each parallel branch are arranged in an inverted V-shape, wherein N is a natural number less than or equal to 10.

11. The electronic candle according to claim 10, wherein the light source module is rotatably connected to the housing; a magnetic element is fixed at a lower end of the circuit board; and the power module comprises a coil, and the coil is opposite to the magnetic element at the lower end of the circuit board of the light source module.

12. The electronic candle according to claim 10, wherein the plurality of parallel branches from bottom to top comprise a first parallel branch, a second parallel branch . . . , and a Nth parallel branch; wherein the first parallel branch is configured to simulate an inner layer of a candle flame, and a maximum width of the first parallel branch is at least smaller than a maximum width of the second parallel branch or the third parallel branch; at least the second parallel branch and the third parallel branch are configured to simulate a middle layer of the candle flame; and at least the N−1th parallel branch and the Nth parallel branch are configured to simulate an outer layer of the flame, and a maximum width of the Nth parallel branch is smaller than a maximum width of the N−1th parallel branch.

13. The electronic candle according to claim 12, wherein a distance from a vertex of the Nth parallel branch to a vertex of the N−1th parallel branch is greater than a distance from the vertex of the N−1th parallel branch to a vertex of the N−2th parallel branch, and the distance from the vertex of the N−1th parallel branch to a vertex of the N−2th parallel branch is greater than a distance from a vertex of the second parallel branch to a vertex of the first parallel branch.

14. The electronic candle according to claim 12, wherein a number of the point light sources on the Nth parallel branch is greater than a number of the point light sources on the other parallel branches.

15. The electronic candle according to claim 10, wherein a lowest end of a parallel branch located at an upper layer is higher than a lowest end of a parallel branch located at a lower layer.

16. The electronic candle according to claim 10, wherein the control circuit module is fixed at a lower end of one side of the circuit board, and has a power interface, a grounding interface and N input/output interfaces; wherein the power interface and the grounding interface are connected to a power module, one end of each of the N parallel branches is connected to the power interface, and the other end thereof is connected to a corresponding input/output interface.

17. The electronic candle according to claim 10, wherein an upper surface of the circuit board is encapsulated by yellow colloid used as an optical processing unit, to wrap the point light sources.

18. The electronic candle according to claim 17, wherein the encapsulated part of the circuit board by the yellow colloid is bulging in the middle and thin at edges.

19. The electronic candle according to claim 17, wherein the point light sources are COB (chip-on-board)-LED light sources.

* * * * *